(12) United States Patent
Fodor et al.

(10) Patent No.: US 10,477,516 B2
(45) Date of Patent: Nov. 12, 2019

(54) DEVICE TO DEVICE OPERATION IN OUT OF NETWORK COVERAGE

(71) Applicant: Telefonaktiebolaget LM Ericsson (publ), Stockholm (SE)

(72) Inventors: Gabor Fodor, Hässelby (SE); Muhammad Kazmi, Sundbyberg (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/528,536

(22) PCT Filed: Oct. 8, 2015

(86) PCT No.: PCT/SE2015/051071
§ 371 (c)(1),
(2) Date: May 22, 2017

(87) PCT Pub. No.: WO2017/061913
PCT Pub. Date: Apr. 13, 2017

(65) Prior Publication Data
US 2017/0303238 A1   Oct. 19, 2017

(51) Int. Cl.
*H04W 72/02* (2009.01)
*H04W 64/00* (2009.01)
(Continued)

(52) U.S. Cl.
CPC ........... *H04W 72/02* (2013.01); *H04W 4/025* (2013.01); *H04W 64/00* (2013.01);
(Continued)

(58) Field of Classification Search
CPC ... H04W 4/70; H04W 72/02; H04W 72/0453; H04W 4/02; H04W 64/00; H04W 4/025
(Continued)

(56) References Cited

U.S. PATENT DOCUMENTS

2006/0281404 A1* 12/2006 Lee ..................... H04B 7/2606
                                                                    455/11.1
2014/0307642 A1  10/2014 Wänstedt et al.
(Continued)

FOREIGN PATENT DOCUMENTS

WO          2015115967 A1     8/2015

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.9.0, Oct. 2015, 1-765.

(Continued)

*Primary Examiner* — Rownak Islam
(74) *Attorney, Agent, or Firm* — Patent Portfolio Builders, PLLC

(57) ABSTRACT

The present disclosure relates to methods and devices for device-to-device, D2D, operation in out-of-network coverage, ONC scenarios. More particularly the disclosure pertains to a method performed in a wireless device, for obtaining resources for D2D operation in ONC. The method comprises obtaining S1 a first set of resources for D2D operation in ONC on at least one licensed carrier and obtaining S2 a second set of resources for D2D operation in ONC on at least one un-licensed carrier. The method further comprises selecting S3 one of the first and second sets of resources for D2D operation in ONC, based on information relating to a location of the wireless device. The disclosure further relates to methods in a network node for providing information about the sets of resources to a wireless device and to corresponding devices and computer programs.

32 Claims, 6 Drawing Sheets

(51) Int. Cl.
*H04W 72/04* (2009.01)
*H04W 4/02* (2018.01)
*H04W 4/70* (2018.01)

(52) U.S. Cl.
CPC .......... *H04W 72/0453* (2013.01); *H04W 4/02* (2013.01); *H04W 4/70* (2018.02)

(58) Field of Classification Search
USPC ........................................................ 370/329
See application file for complete search history.

(56) References Cited

U.S. PATENT DOCUMENTS

| | | | |
|---|---|---|---|
| 2015/0201392 A1 | 7/2015 | Sartori et al. | |
| 2015/0327312 A1* | 11/2015 | Burbidge | H04W 72/14 370/329 |
| 2015/0382389 A1* | 12/2015 | Seo | H04W 76/14 370/280 |
| 2016/0135168 A1* | 5/2016 | Liu | H04W 72/048 370/329 |
| 2016/0353416 A1* | 12/2016 | Takano | H04W 76/14 |
| 2017/0118765 A1* | 4/2017 | Kalhan | H04W 76/14 |
| 2018/0199312 A1* | 7/2018 | Wu | H04W 72/02 |

OTHER PUBLICATIONS

Unknown, Author, "V2X scenarios", 3GPP TSG-RAN WG2 #91 bis, Tdoc R2-154670, Malmo, Sweden, Oct. 5-9, 2015, 1-4.

* cited by examiner

DEVICE TO DEVICE OPERATION IN OUT OF NETWORK COVERAGE

TECHNICAL FIELD

The present disclosure relates to methods and devices for device-to-device, D2D, operation. In particular the disclosure relates to obtaining resources for device to device, D2D, operation in out-of-network coverage, ONC, scenarios.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Radio Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 Hz when carrier aggregation is employed. LTE is also able to operate in different frequency bands and can operate in at least Frequency Division Duplex, FDD and Time Division Duplex, TDD, modes.

Device-to-device communication is a well-known and widely used component of many existing wireless technologies, including ad hoc and cellular networks. Recently, device-to-device, D2D, communications as an underlay to cellular networks have been proposed as a means to take advantage of the proximity of communicating devices and at the same time to allow devices to operate in a controlled interference environment. D2D is also interchangeably called proximity services, ProSe. ProSe is also the terminology used in the 3GPP LTE specifications. Similarly D2D operation is also interchangeably called ProSe operation and a D2D capable wireless device is also interchangeably called a D2D User Equipment, UE, or a ProSe UE.

In other words, D2D communications enable devices in the proximity of each other to communicate in a peer-to-peer (i.e. direct) fashion rather than communicating through some wireless access point or base station. In practice, ProSe UEs in the 3GPP LTE system utilize the cellular uplink spectrum, i.e. they transmit ProSe signals or channels in the uplink part of the spectrum.

According to state of the art solutions, D2D operation by a UE is performed in a half-duplex mode, i.e. the UE can either transmit D2D signals/channels or receive D2D signals/channels. There may also be D2D relay UEs that may relay some signals to other D2D capable UEs. There is also control information for D2D, some of which is transmitted by UEs and the other is transmitted by eNBs (e.g., D2D resource grants for D2D communication transmitted via cellular DL control channels). The D2D transmissions may occur on resources which are configured by the network or selected autonomously by the D2D enabled UE.

In LTE, when a ProSe UE is in ONC then ProSe operation is allowed only in licensed geographical areas. Hence, the UE has to detect its location, which may be done e.g. by using a Global Navigational Satellite System, GNSS, such as the Global Positioning System, GPS, and find whether it is in a Licensed Area, LA, or in unlicensed areas, ULA.

With the existing solution, the UE must stop ProSe operation when in ULA. This means the UE cannot use ProSe on preconfigured resources. This can be a major limitation under warning or public safety situations etc. since terminating ProSe operation may put life and property at risk.

Furthermore, in certain locations the UE may not be able to detect or cannot reliably determine its location such as in areas without GNSS coverage or with poor GNSS coverage. Therefore it has to stop ProSe operation when ONC if it cannot find its location e.g. due to lack of GPS coverage such as in tunnels. In this situation the UE is required to stop ProSe operation to prevent interference towards WAN/cellular or other network e.g. network managing medical equipment. This can also be a major limitation under warning or public safety situations.

SUMMARY

An object of the present disclosure is to provide a radio network node which seeks to mitigate, alleviate, or eliminate one or more of the above-identified deficiencies in the art and disadvantages singly or in any combination.

This object is achieved by a method performed in a wireless device, for obtaining resources for device to device, D2D, operation in out-of-network coverage, ONC. The method comprises obtaining a first set of resources for D2D operation in ONC on at least one licensed carrier and obtaining a second set of resources for D2D operation in ONC on at least one un-licensed carrier. The method further comprises selecting one of the first and second sets of resources for D2D operation in ONC, based on information relating to a location of the wireless device.

By providing at least two different sets of D2D resources a D2D UE may continue performing D2D operation in ONC even when the wireless device is located in un-licensed areas. Thereby, a D2D UE is enabled to perform critical operation in ONC. Because different sets of resources are used, a wireless device in ONC is able to utilize available spectrum resources (licensed and un-licensed) in an efficient manner.

According to some aspects the method comprises attempting to determine a location of the wireless device. Then the selecting comprises selecting the first set of resources when the location is determined to be within a coverage area of the at least one licensed carrier and selecting the second set of resources when failing to determine the location or when the location is determined to be outside a coverage area of the at least one licensed carrier. Thereby, a D2D UE may to continue performing D2D operation in ONC even when the UE cannot determine its location.

According to some aspects the disclosure relates to a method performed in a network node, for assisting device to device, D2D operation in out-of-network coverage, ONC. The method comprises determining a first set of resources for D2D operation in ONC on at least one licensed carrier and determining a second set of resources for D2D operation in ONC on at least one un-licensed carrier and transmitting information related to the determined first and second sets of resources for D2D operation in ONCs to the wireless device. Hence, the network node can assist wireless devices to utilize the radio spectrum in an efficient way also when they are out of network coverage.

According to some aspects the disclosure relates to a wireless device being configured for device-to-device, D2D, communication in a communication system. The wireless device comprises radio circuitry and processing circuitry. The processing circuitry is configured to obtain a first set of resources for D2D operation in ONC on at least one licensed carrier and to obtain a second set of resources for D2D operation in ONC on at least one un-licensed carrier. The processing circuitry is further configured to select one of the first and second sets of resources for D2D operation in ONC, based on information relating to a location of the wireless device.

According to some aspects the disclosure relates to a network node in a cellular communication network configured for assisting device to device, D2D operation in out-of-network coverage, ONC. The network node comprises a communication interface and processing circuitry. The processing circuitry is configured to determine first set of resources for D2D operation in ONC on at least one licensed carrier, to determine a second set of resources for D2D operation in ONC on at least one un-licensed carrier and to transmit, using the communication interface, information related to the determined first and second sets of resources for D2D operation in ONCs to the wireless device.

According to some aspects, the disclosure relates to computer program comprising computer program code which, when executed in a wireless device or network node, causes the wireless device or network node to execute the methods described above and below.

With the above description in mind, the object of the present disclosure is to overcome at least some of the disadvantages of known technology as described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
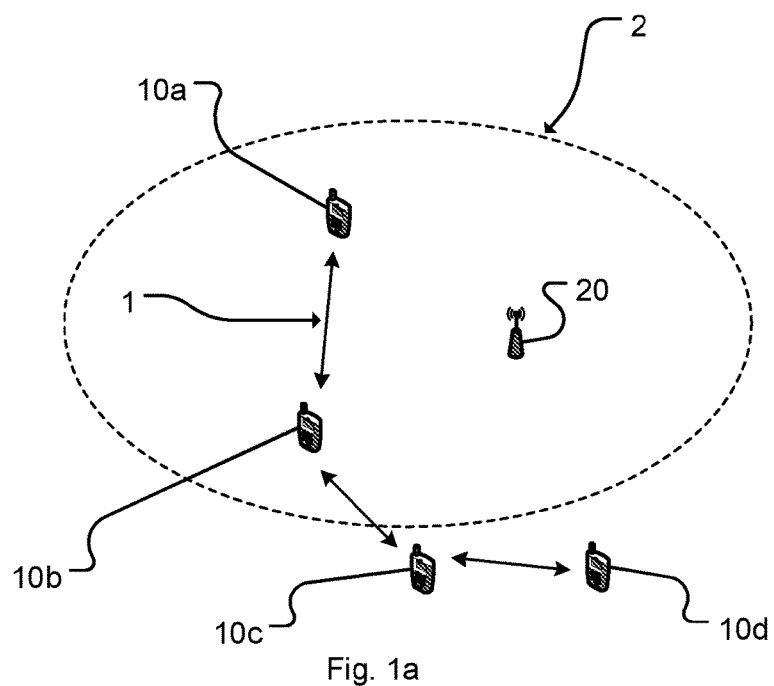
FIG. 1a illustrates a D2D operating scenario.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Within the context of this disclosure, the terms "wireless device" or "wireless terminal" encompass any terminal which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

In some embodiments the term "network node" is used and it can correspond to any type of network node or any network node, which communicates with a UE and/or with another network node. Examples of network nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

In some embodiments the term out of coverage, OOC, is used. The OOC may also interchangeably be called ONC, out of WAN coverage, out of cellular coverage, any cell selection state (i.e. the situation when a UE cannot find a cell in the selected Public Land Mobile Network) etc. In an ONC scenario, ProSe UEs communicating with each other are not under network node coverage. It means that the ProSe UEs cannot receive signals from and/or transmit signals to any network node in the network. The network here refers to a wide area network being a part of the licensed spectrum, such as the cellular networks discussed in the background section. Typically the lack of coverage is due to complete absence of the network coverage in the vicinity of the ProSe UEs. Due to which the ProSe UEs cannot use timing and frequency synchronization based on signals from any cell in the network.

D2D operation is a generic term which comprises transmission and/or reception of any type of D2D signals (e.g. physical signals, physical channel etc.) by a D2D communication capable UE and/or by a D2D discovery capable UE. D2D operation therefore comprises D2D transmission, D2D reception, D2D communication etc. In this disclosure D2D operation is therefore interchangeably called D2D transmission and/or reception, ProSe operation, ProSe discovery, ProSe communication etc.

A D2D enabled or capable UE, here referred to as a D2D UE, is also interchangeably called ProSe capable UE or ProSe UE. Similarly D2D operation is also interchangeably called ProSe operation. A D2D discovery capable UE is also referred to as a UE capable of ProSe direct discovery, and D2D direct communication UE is also referred to as UE capable of ProSe direct communication. The link and/carrier that is used for the D2D direct communication and D2D direct discovery between UEs is referred to as "sidelink". The D2D operation performed by the UE may broadly comprise ProSe reception (i.e. receiving D2D signals) and/or or D2D transmission (i.e. transmitting ProSe signals). Vehicular to X, V2X, operation is another variant of D2D operation. V2X enables communication between vehicle and any one or more of another vehicle, infrastructure and pedestrian. Therefore X may denote 'vehicular' (also known as V2V) or X may denote 'pedestrian' (also known as V2P) or X may denote 'infrastructure' (also known as V2I) and so on. The embodiments are applicable for any type of D2D operation including ProSe, V2X and so on.

This disclosure mainly uses ProSe operation in LTE as an example. Therefore, the examples herein often refer to a ProSe UE. However the embodiments are applicable to any Radio Access Technology, RAT or multi-RAT systems, where the UE receives and/or transmit signals (e.g. data) e.g. LTE Frequency division duplex, FDD/Time division duplex, TDD, WCDMA/HSPA, GSM/GERAN, Wi-Fi, WLAN, CDMA2000 etc.

In this disclosure reference is made to a "licensed carrier". A licensed carrier refers to a carrier that is licensed to a licensee that has an exclusive right to the spectrum in a defined area. In other words a licensee has an exclusive right to a specific set of spectrum resources in a defined area. The licensed carrier is e.g. licensed to the owner of a communication network. One advantage associated with a licensed spectrum and a licensed carrier is that the license enables the licensee to control the resources, whereby performance increases.

D2D in LTE

In LTE, D2D communication implies transmitting by a D2D transmitter D2D data and D2D communication control information with scheduling assignments, SAs, to assist D2D receivers of the D2D data. The D2D data transmissions are according to configured patterns and in principle may be transmitted rather frequently. SAs are transmitted periodically. D2D transmitters that are within the network coverage may request eNodeB resources for their D2D communication transmissions and receive in response D2D resource grants for SA and D2D data. Furthermore, eNodeB may broadcast D2D resource pools for D2D communication.

D2D discovery messages are transmitted in infrequent periodic subframes. ENodeBs may broadcast D2D resource pools for D2D discovery, both for reception and transmission.

In LTE, D2D communication supports two different modes of D2D operation called mode 1 and mode 2.

In mode 1, the location of the resources for transmission of the scheduling assignment by the broadcasting UE comes from the eNodeB. The location of the resource(s) for transmission of the D2D data by the broadcasting UE comes from the eNodeB.

In mode 2 a resource pool for scheduling assignment is pre-configured and/or semi-statically allocated. The UE on its own selects the resource for scheduling assignment from the resource pool for scheduling assignment to transmit its scheduling assignment.

Current Status of Spectrum Usage for D2D

Current work in the standardization of 3GPP EUTRA Release 12 version 12.9.0 of TS 36.101 supports ProSe operation in the frequency bands shown by Table 1. As noted from the table, ProSe Direct Discovery operation is supported in both licensed FDD and TDD bands while ProSe Direct Communication is only supported in FDD bands.

TABLE 1

Supported frequency bands in 3GPP Release 12

| E-UTRA ProSe Band | E-UTRA Operating Band | ProSe UE transmit $F_{UL\_low}$-$F_{UL\_high}$ | ProSe UE receive $F_{DL\_low}$-$F_{DL\_high}$ | ProSe Duplex Mode | ProSe Direct Disc. | ProSe Direct Comm. |
|---|---|---|---|---|---|---|
| 2 | 2 | 1850 MHz-1910 MHz | 1850 MHz-1910 MHz | HD | Yes | |
| 3 | 3 | 1710 MHz-1785 MHz | 1710 MHz-1785 MHz | HD | Yes | Yes |
| 4 | 4 | 1710 MHz-1755 MHz | 1710 MHz-1755 MHz | HD | Yes | |
| 7 | 7 | 2500 MHz-2570 MHz | 2500 MHz-2570 MHz | HD | Yes | Yes |
| 14 | 14 | 788 MHz-798 MHz | 788 MHz-798 MHz | HD | Yes | Yes |
| 20 | 20 | 832 MHz-862 MHz | 832 MHz-862 MHz | HD | Yes | Yes |
| 26 | 26 | 814 MHz-849 MHz | 814 MHz-849 MHz | HD | Yes | Yes |
| 28 | 28 | 703 MHz-748 MHz | 703 MHz-748 MHz | HD | Yes | Yes |
| 31 | 31 | 452.5 MHz-457.5 MHz | 452.5 MHz-457.5 MHz | HD | Yes | Yes |
| 41 | 41 | 2496 MHz-2690 MHz | 2496 MHz-2690 MHz | HD | Yes | |

Proximity Services in licensed spectrum is currently allowed only in licensed geographical areas, both in In-Coverage, InC, and out of network coverage, ONC.

ProSe capable UE can be preconfigured with radio resources that it can use for ProSe operation in ONC. The resources are typically pre-configured or applicable for certain geographical area. For example, in country A or region A1 within country A, UE is allowed to operate ProSe using pre-configured resources when in ONC while in country B or region B1 within country B, UE may not be allowed to use the pre-configured ProSe resources when in ONC even if UE knows its own location. A1 is called licensed geographical area, LA. B1 is called un-licensed area, ULA. If a UE does not know (cannot determine) its geographical location, the UE is not allowed to perform ONC ProSe operation. The licensed and un-licensed geographical areas are designated by the local regulatory authorities in their respective jurisdiction e.g. to avoid coexistence problems with other systems.

The consequence of the above ProSe UE behavior is that ProSe cannot be used if UE cannot find its location or if it is in ULAs.

As discussed above, this gives rise to two main problems, which are summarized in Table 2 below.

TABLE 1

Problem Scope

| Is ProSe UE operation in licensed spectrum allowed? | UE in coverage (InC) | UE is ONC |
|---|---|---|
| Location is not known | Allowed: NW controls and takes responsibility of ProSe operation | Not allowed |

TABLE 1-continued

Problem Scope

| Is ProSe UE operation in licensed spectrum allowed? | UE in coverage (InC) | UE is ONC |
|---|---|---|
| Location known | Allowed: NW controls and takes responsibility for ProSe operation | Allowed on predefined (preconfigured) resources if within LA. Not allowed in ULA. |

The first problem is that with the current specification, when a UE is in an ULA, the UE must stop ProSe operation (i.e. ProSe transmissions) even if it knows its location. This means the UE cannot use ProSe on preconfigured resources. This can be a major limitation under warning or public safety situations etc. since terminating ProSe operation may put life and property at risk.

In addition, at certain locations the UE may not be able to detect or cannot reliably determine its location such as in areas without GNSS coverage or with poor GNSS coverage. Therefore, if the UE cannot determine its location, the UE has to stop ProSe operation, when out of network coverage. Reasons for the UE being unable to determine its location include e.g. lack of GPS coverage or lack of other GNSS coverage. This may be the case in tunnels or at network failure etc. In this situation the UE is required to stop ProSe operation to prevent interference towards WAN/cellular or other network, e.g. a network managing medical equipment. This can also be a major limitation under warning or public safety situations.

Figure 1B:
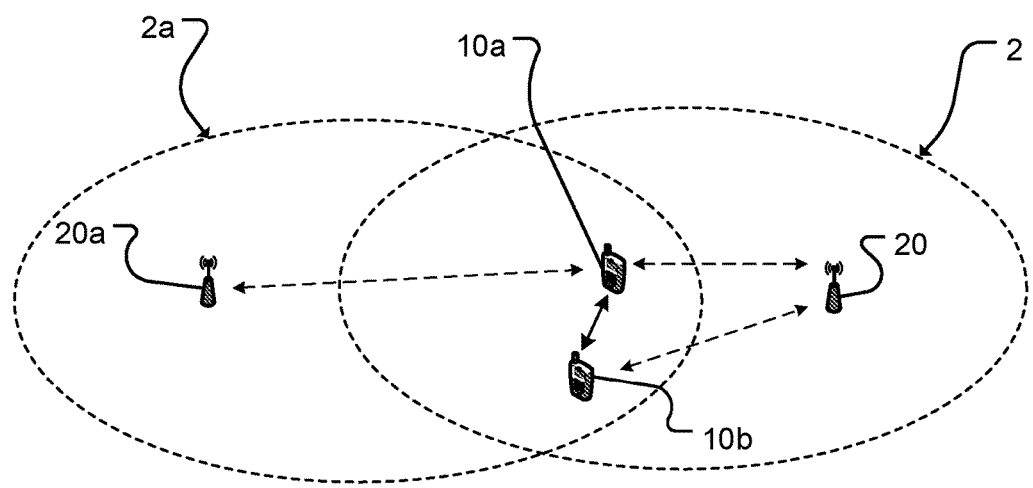
FIG. 1b illustrates a D2D operating scenario, wherein the wireless device is served by two network nodes.

FIG. 1a schematically illustrates a mobile communication network where the proposed technique may be implemented. The network includes wireless devices 10a-10d, i.e. UEs capable of D2D communication. These wireless devices are referred to as ProSe UEs. In FIG. 1a the ProSe UEs exchange information directly, i.e. not over the network. The D2D communication is assisted by a network node, here an eNodeB 20, defining a cell 2. In other words, a typical scenario involves at least one network node 20 serving ProSe UEs in an associated cell 21, say a Primary Cell (PCell), also known as serving cell. The ProSe UE may also be configured with another cell that is configurable upon need basis, say a Secondary Cell 2a (SCell1), such as in dual connectivity as illustrated in FIG. 1b, where the UE 10a is connected to two base stations 20, 20a defining two cells 2, 2a. Note that the configured cells are UE specific.

The ProSe UE is able to operate some ProSe operations while being out of network coverage. Examples of such operations are ProSe Direct Communication, ProSe Direct Discovery etc. The operations may further comprise of ProSe transmission, ProSe reception etc. FIG. 1a illustrates that the ProSe can take place between two or more UEs 10a, 10b which are inside the network coverage area. ProSe can also take place between UEs 10b, 10c which are partly in network coverage, lastly also between UEs 10c, 10d, which are completely out of network coverage.

The ProSe UEs 10a-10d can be pre-configured by the PCell with ProSe resources for ProSe operation of the ProSe UE on a sidelink 1. The pre-configured ProSe resources may in particular be used by the ProSe UE when operating in ONC. The sidelink 1 may typically operate on a carrier of the PCell (also known as serving carrier frequency or intra-frequency carrier). The sidelink 1 may also be configured for ProSe operation on a non-serving carrier of the ProSe UE e.g. inter-frequency carrier frequency for WAN measurements or carrier frequency only configured for ProSe operation.

Prior to entering in out-of-network coverage, here referred to as ONC, the ProSe UE may be configured (also known as pre-configured) with some resources that the UE may use while operating in ONC. The pre-configuration of resource can be performed by one or more means e.g. historical data or statistics, autonomously, retrieving data stored on the Subscriber Identity Module, SIM, card, by receiving it from a network node (e.g. the last serving cell such as PCell and/or SCell(s)) etc.

In order not to harm other type of services/operations (e.g. cellular operation also known as Wide Area Network, WAN, operation, non-cellular Radio Access Technologies, RATs, such as radar) when operating in ONC using the preconfigured resources, the ProSe UE is only allowed to use the pre-configured resources in ONC if the UE can detect its location and the detected location is within the coverage of a LA. As discussed above, this implies that the UE is not allowed to use the pre-configured resources if it is detected that the UE is not within the coverage of a LA or if the UE is not able to detect its location.

To overcome these problems, this disclosure proposes that a D2D enabled wireless device obtains different sets of D2D resources and uses these depending on certain criteria. In other words, the basic idea of the proposed solution is to be proactive and assisting wireless devices in selecting radio resources for use in scenarios when the wireless devices are out of network coverage. This may partly be proactively done by the network nodes, while the wireless devices are still in coverage.

The principle is that that a D2D capable wireless device is pre-configured to be able to obtain at least two different sets resources that can be used for D2D operation when operating in ONC. The wireless devices then uses one of the two sets of the obtained information for D2D operation when out of network coverage based on whether it operates in licensed or un-licensed areas and depending on whether or not it can detect its location. The wireless device can obtain the above information autonomously (e.g. preconfigured via SIM card etc.) and/or by receiving it from a network node.

Figure 2:
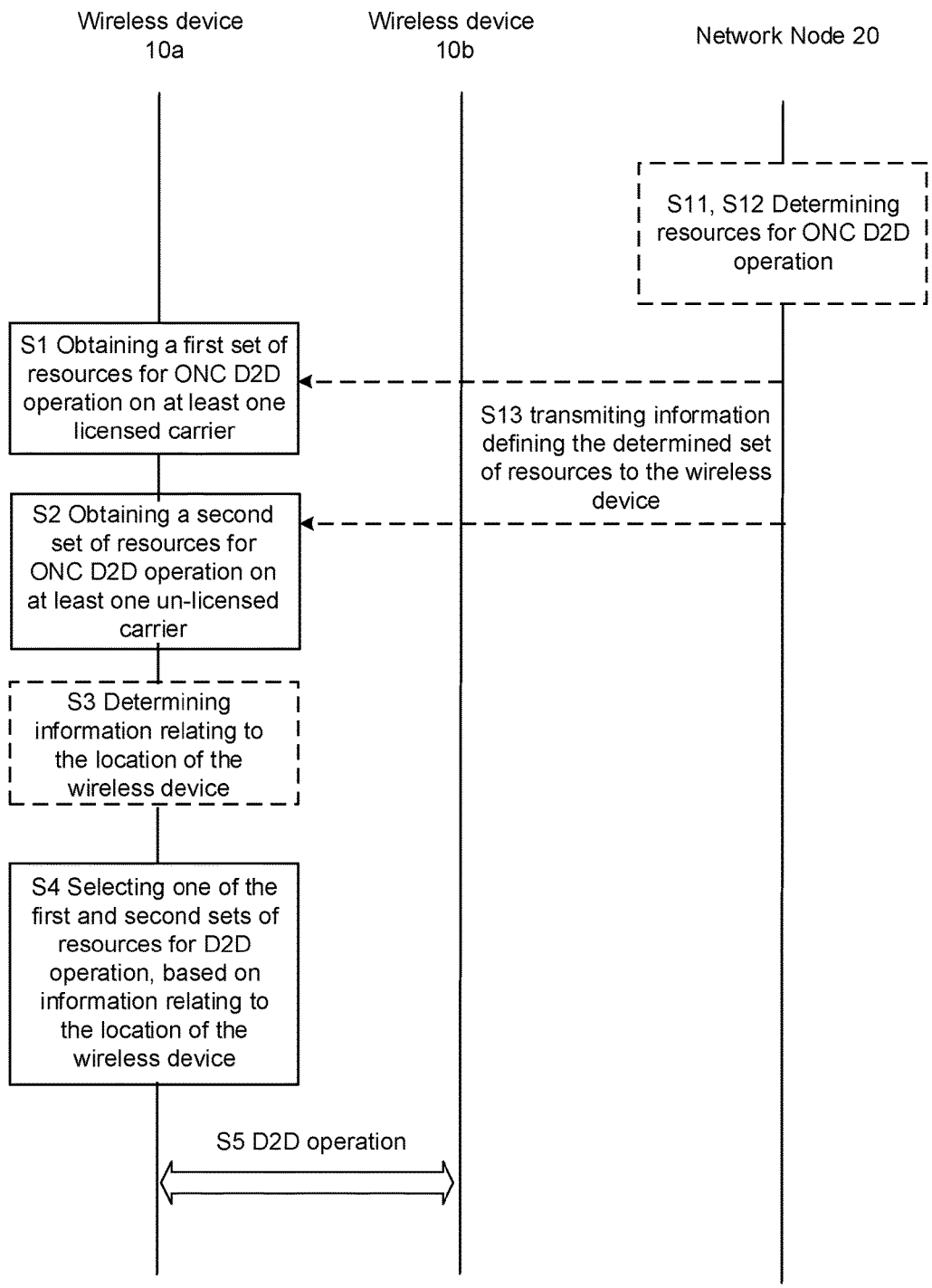
FIG. 2 is a signaling diagram illustrating the proposed technique.

The proposed technique will now be briefly described referring to FIG. 2, which illustrates, according to one example embodiment, the actions of and signaling between a wireless device, here a UE 10a, and a network node 20, when the UE is about to perform D2D ONC operation with another UE 10b.

In accordance with the proposed technique a UE obtains, step S1 and S2, information about two different sets of radio resources that may be used for D2D. In this example the obtaining implies receiving the information from the network node 20. This implies that the network node 20 determines in steps S11, S12 a first and a second set of resources for ONC D2D operation. The first set of information defines D2D resources for operation on at least one licensed carrier when the UE is in ONC. The second set of information on the other hand comprises D2D resources for operation on at least one un-licensed carrier when the UE is ONC. The network node may determine the first- and second sets of resources based on different criteria and also different methods such as autonomously or using pre-configured information.

The network node may then transmit S13 information related to the determined first and second sets of resources for D2D operation in ONCs to the UE 10a. Of course, this step needs to be performed while the UE is still is within network coverage.

The UE may then move Out-of-Network Coverage, ONC, or may lose coverage due to other reasons such as tunnels, network error etc. As mentioned above the UE may use D2D operation even when in ONC.

Then the UE determines in step S3 information relating to the location of the UE, or at least attempts to determine the location of the UE, and selects in step S4 one of the first and second sets of resources for D2D operation, based on the information relating to the location of the UE. In other words, the UE detects which one of the two sets to use, depending on whether the UE operates in licensed or un-licensed areas and whether or not it can detect its location.

When the UE is out of network coverage, the obtained sets may be used, S5, by the UE for D2D communication. The D2D operation may involve exchange of one or more signals, which is not disclosed in the figure though. Hence, by using the proposed technique, the UE may always use some D2D resources, even though the set of resources for D2D operation on an un-licensed carrier are potentially subject to more interference. Hence, from the UE perspective, the proposed solution allows the D2D UE to continue operating D2D also in ONC in addition to in InC. This is necessary e.g. for mission critical D2D services. In general, the possibility to use D2D when being ONC is beneficial, as it may be the only way for the wireless device to communicate.

In LTE, the proposed technique may also be applied in heterogeneous networks supporting dual connectivity and in networks employing carrier aggregation of multiple carriers that is when a UE is served by one Primary Cell, PCell, and one or more Secondary cells, SCells. The proposed technique may be applied regardless of whether PCell and one or more SCells are served by the same or different network nodes. In the case of carrier aggregation a ProSe UE can be pre-configured with ProSe resources for ProSe operation on a sidelink 1, which may operate on carrier of PCell or of SCell or of any non-serving carrier. The ProSe UE can be pre-configured with ProSe resources for ProSe operation on a plurality of sidelinks, e.g. carriers of PCell, SCell1 and non-serving carriers.

Example Operations

Figure 3:
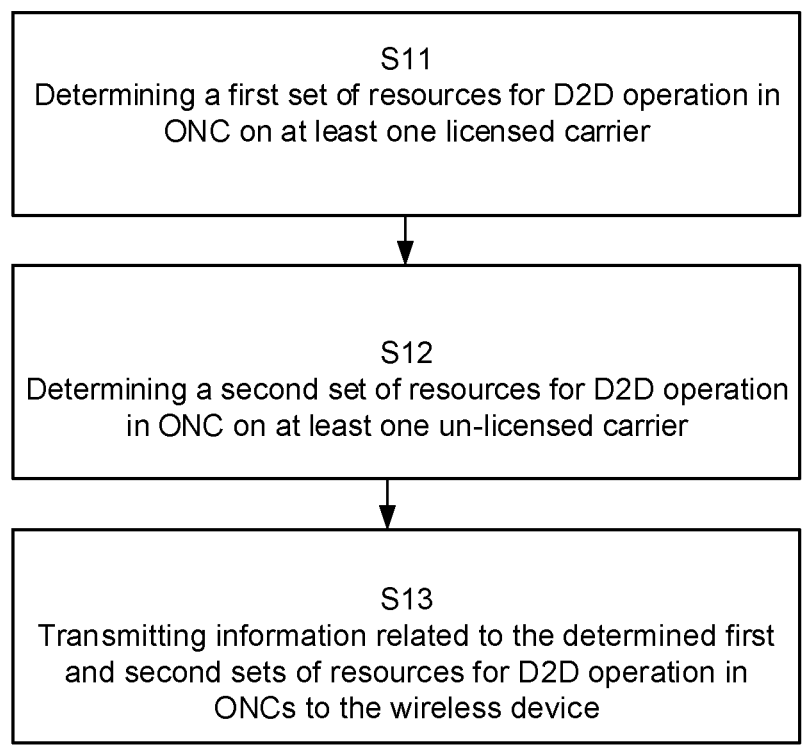
FIG. 3 is a flowchart illustrating method steps performed by a wireless device according to some example embodiments.

The proposed methods performed in a network node for assisting D2D operation in ONC, will now be presented referring to FIG. 3 illustrating method steps performed by a network node, according to some of the example embodiments. Hence, FIG. 3 illustrates a method in a network node for configuring wireless device with D2D resources for D2D operation in ONC.

Examples of such pre-configurable resources for D2D operation or D2D resources are time resources (e.g. D2D subframes, time slots, symbols, TTI etc.), physical channels (e.g. resource blocks, RB, resource elements, RE, physical RB, PRB, virtual RB etc.), spectrum resources such as frequency bands, carrier frequencies etc. The D2D UE may also be configured by the network node using higher layer signaling with one or more emission control parameters such as maximum power. The D2D UE applies the emission control parameters when transmitting D2D signals using pre-configured D2D resources for D2D operation in ONC.

Specific examples of emission control parameters are "P-Max-ProSe" which is a parameter in LTE used to limit the maximum transmit power when the ProSe UE operates in ONC and "additionalSpectrumEmissions-ProSe" which is a parameter used to adjust the transmission to meet the region-specific regulatory emission requirements when ProSe UE operates in ONC.

In brief, the overall procedure in the network node comprises of the network node determining a first set and a second set of information based on at least one or numerous criteria which are explained below, and then communicating this information to the UE.

The method comprises the step of determining S11 a first set of resources for D2D operation in ONC on at least one licensed carrier. This step implies e.g. that a eNodeB determines a first set of ProSe resources (e.g. band, carrier, physical channels etc.) to be used by a ProSe UE for operating ProSe on at least one licensed carrier (LC) when the UE is in ONC. On the LC, the resources can be accessed by the UE in a contention-free manner.

This first set of resources is typically meant to be used by the wireless device provided that the wireless device can itself detect its location and when the wireless device can detect that it is within the coverage of the licensed area, LA. The first set of resources is also used when the wireless device can implicitly detect its location e.g. by receiving indication/signals from another D2D UE and when the wireless device can detect that it is within the coverage of LA.

The coverage of the LA and the coverage of the ULA can be expressed in terms of geographical boundaries. The geographical boundaries in turn can be determined by a set of geographical coordinates, which can be configured at the wireless device e.g. pre-defined, received from the network node etc.

The contention-free access of resources on frequency carrier (or any part of spectrum also known as licensed carrier or spectrum) herein means that the resources can only be used by those wireless devices which subscribe to a designated operator. Only the designated operator is assigned the license to operate such licensed carriers or part of the spectrum.

In contention-free access of resources on frequency carrier (or any part of spectrum also known as un-licensed carrier or spectrum) any wireless devices regardless of its subscription or affiliation to any operator is allowed to access resources on any un-licensed carrier. To enable contention-free access no operator is assigned or owns license for operating any of the un-licensed carrier or part of the spectrum.

One advantage associated with a licensed spectrum and a licensed carrier is that the license enables the licensee to control of resources, whereby performance increases. Hence the first set of resources typically relate to resources which have been assigned or reserved or allocated for D2D traffic, by a licensee.

The method further comprises the step of determining S12 a second set of resources for D2D operation in ONC on at least one un-licensed carrier. This step implies e.g. that a eNodeB determines a second set of information about ProSe resources comprising of at least a second set of ProSe resource (e.g. band, carrier, physical channels etc.) to be used by the UE for operating ProSe on at least one ULC when the UE is ONC, wherein on the ULC, the resources can be accessed by the UE in contention-based mechanism. The second set of resources are meant to be used by the UE provided that the UE can detect its location and when the UE can detect that it is NOT within the coverage of the LA or that the UE cannot detect its location e.g. when operating in region which lacks GPS coverage.

The method also comprises transmitting S13 information related to the determined first and second sets of resources for D2D operation in ONCs to the wireless device. According to some aspects, the information is transmitted S13 using different mechanisms. One example is broadcasting system information on a broadcast channel, such as the System Information Block, SIB, in LTE that are messages that broadcasts common information to all UEs in a cell.

The information may also be transmitted as at least one dedicated or wireless device specific message, as non-Access stratum signaling message or by and transmitting a message on Medium Access Control, MAC, level.

According to some aspects, the information further comprises information defining when to use the first and second sets of resources. For example, the information can comprise thresholds of signal measurements performed by a UE, such as the Received Signal Strength Indicator, RSSI, signal strength or signal quality on a carrier or band. Depending on the signal measurements exceeding or staying below the said thresholds, the UE can start using the first set or the second set of resources for D2D operation in ONC. In this example, the UE uses the resources that are less congested and thereby the ProSe operation can achieve higher performance than when such signal measurements are not taken into account when selecting the first or second set of resources.

As a second example on the information defining when the to use the first or second set of resources, the network node can specify a first set of services that should use the first set of resources and a second set of services that should use the second set of resources. For example, real time video or streaming services should use the first set of services, while non-real time services such as file download or messaging services should use the second set of services.

According to some aspects, the information comprises restrictions for using the first and second set of resources. For example, the information can comprise restriction on the maximum transmit power that the UE may use on the first and second set of resources respectively. For example such restriction may confine the maximum transmit power to 250 mW on the first set of resources and 100 mW on the second set of resources. As another example, the information can limit the effective radiated power or equivalent isotropically radiated power that the UE may use on the first and second set of resources.

The determining of the first and second sets of resources may be based on different criteria such as load on carriers, a location of the wireless device, a priority level or the type of the D2D operation and information about location of possible carrier frequencies in the frequency bands. These criteria will now be described in further detail.

The Load on Carriers

One factor that matters when selecting the carrier for D2D operation in ONC is the load on different carriers in that particular region. Load on a carrier can be determined by one or more performance measures such as number of active UEs, utilization of physical channels (e.g. percentage of UL and/or DL resource blocks used for D2D and/or non-D2D UEs), total transmit power on a carrier etc. For example load on a carrier is considered high if resource block usage on that carrier is more than 70%.

The carriers may already be used for D2D operation or by other services like cellular, or they may also be new carriers which can be used for D2D. The load may of course look different depending on the scenario and area of operation. But it is important to take into account load to avoid configuring D2D operation in already loaded carriers. The network node may typically assign the UE with resources on less loaded carriers for D2D operation. Since D2D can be used in emergency situations, the consequence of configuring D2D in an already fully loaded carrier can degrade performance of the services if they cannot be made available in emergency situations.

UE Location

The network node may also take into account information on UE location and the expected UE location in near future when determining what resources to allocate the UE for D2D operation. The selection of bands can be based on UE's current location, or the location of UE in near future when operating D2D. For example, if the UE is expected to be in a LA when using the D2D services then the network node may allocate resources on one of the licensed bands to that user. On the other hand if the UE is expected to be in an ULA, then the network node may allocate resources or provide information to enable the UE to use un-licensed bands. Therefore it may be beneficial for the network node to use the information on UE's current or future location when determining the bands for D2D operation in ONC. The network node may obtain information about the UE's current or expected future location using one or more positioning methods and/or a UE mobility profile comprising e.g. UE speed, direction of motion etc.

Type of D2D Operation

The network node may also use information on type of D2D operation when determining the resources for D2D operation in ONC. There are different D2D operations, e.g. public safety D2D services, commercial D2D services such as V2X, D2D Direct Discovery, D2D Direct Communication etc. Depending on the intended service, the network node can allocate resources differently. For mission critical services (e.g. D2D Direct Communication for public safety or V2V) network node can allocate more reliable resources, e.g. bands which are less loaded than others or on dedicated D2D carriers. But for services which are less mission-critical, resources can be allocated on bands which are relatively loaded e.g. resource block usage is 60% or more. The different D2D services may also require different amount of resources. For example, D2D Direct Discovery operation may involve infrequent D2D transmissions/receptions over a few D2D subframes while D2D Direct Communication operation may involve frequent D2D transmissions/receptions. Allocating many of such UEs in a same carrier may change the load in that carrier in certain way, and it may be beneficial to allocate the D2D UEs in a mixed fashion in order not to overload the network in some scenarios. In other scenarios, it may be beneficial for the network node to allocate a less loaded carrier for D2D Direct Communication operation and relatively loaded carrier for D2D Direct Discovery operation.

Vicinity of Bands

The network node may also take into account information on location of different operating carrier frequencies in the frequency bands i.e. their relative proximity in the frequency domain. Generally, two carrier frequencies which are very close to each other in the frequency bands and operate in the same area can cause interference and thus also degrade the performance. The network node may therefore consider vicinity of bands when doing frequency planning for the assignment of the D2D resources. For example for D2D operation the network node may assign resources on frequency band(s), which are far in frequency domain from other operating bands in that region. As an example assume there are three available bands in the ranges of 800 MHz, 1800 MHz and 2100 MHz. In this case the network node may assign resources on carriers belonging to 800 MHz band.

Figure 4:
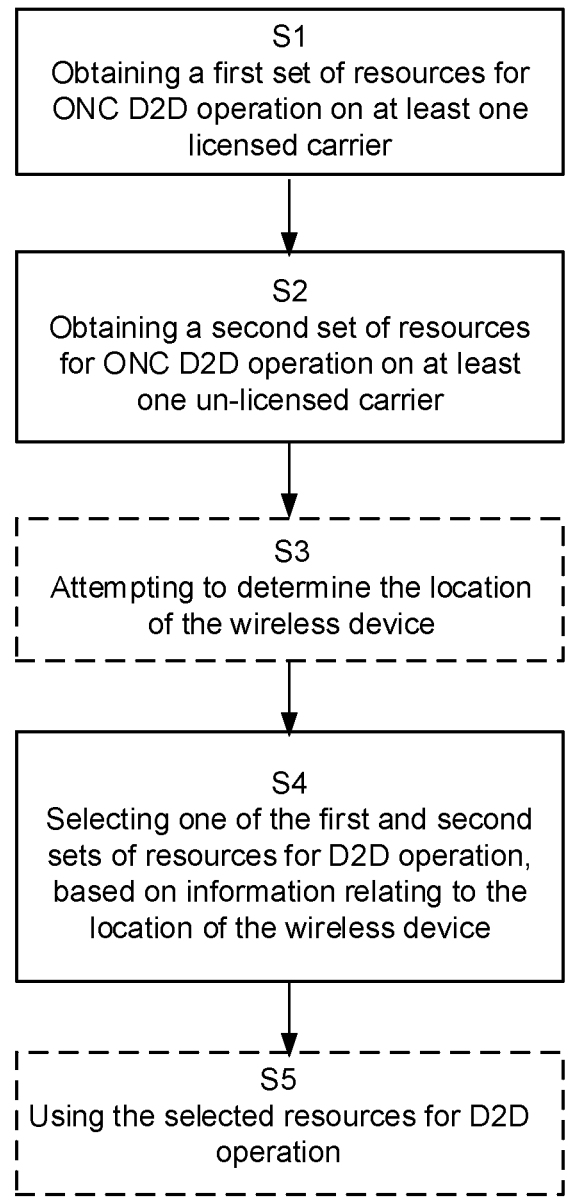
FIG. 4 is a flowchart illustrating method steps performed by a network node according to some example embodiments.

The proposed methods performed in a wireless device for obtaining resources for D2D operation in ONC will now be presented referring to FIG. 4 illustrating method steps performed by the wireless device, according to some of the example embodiments.

According to some aspects of this disclosure, the D2D operation is LTE ProSe operation and the D2D operation takes place on a sidelink. The sidelink is a radio link which is used for transmitting and receiving ProSe signals. Typically sidelink is configured on uplink carrier frequency. But it can also be configured on downlink carrier frequency. The sidelink is analogous to uplink and downlink, which are used for cellular communication. As described above information about ProSe resources or parameters for enabling UE operation in ONC may comprise of one or more of: time resources, physical channels, spectrum resources, emission control etc.

According to some aspects, the resources are radio resources that are identified by a frequency and/or a time measure as discussed in relation to FIG. 3.

The method performed in a wireless device 10 comprises the step of obtaining S1 a first set of resources for D2D operation in ONC on at least one licensed carrier. Hence, according to some aspects, the first set of resources is a contention free set of resources that is reserved for D2D operation. When using a set of resources that are reserved for D2D operation, interference may be reduced in comparison to when using non-licensed resources.

The method performed in a wireless device further comprises obtaining S2 a second set of resources for D2D operation in ONC on at least one un-licensed carrier.

According to some aspects, the obtaining S1, S2 comprises receiving information related to the first and second sets of resources from a network node. In other words, a UE may obtain information on ProSe operation on LC/ULC by receiving it from the serving network node e.g. via UE specific channel and/or via reading broadcast channel sent from network node serving any of the serving cells such as PCell, SCell, PSCell etc.

The UE may also obtain the information on ProSe operation on LC/ULC from other network nodes, such as neighbor network nodes, core-network node, or other type of dedicated or non-dedicated nodes. For example in this case the UE may read the system information sent on a broadcast channel by the network node.

According to some aspects, the obtaining S1, S2 comprises obtaining the first and/or second sets of resources autonomously, i.e. without involving any other nodes. Autonomously may thus imply reading a pre-configured information from the internal memory.

For example, the UE may also be pre-configured with full or partial information related to ProSe operation on LC/ULC. In case of pre-configuration of the partial information some parameters can be pre-configured while the remaining parameters can be received from the network node.

The UE can be pre-configured with one or more parameters related to the ONC ProSe operation by one or more of the following means:
  parameters pre-configured by the last serving cell (e.g. PCell) using signaling,
  parameters pre-configured by the operator e.g. information stored in the SIM-card, information acquired from an application program etc. The UE can retrieve the information when reading information on the SIM card and/or from the application program.
  parameters that are pre-defined in the specification/standard and pre-preprogrammed in the wireless device e.g. at manufacturing. For example carrier information related to LC/ULC, what subframes to use, the maximum allowed transmit power, etc.

The UE may also obtain the full or partial information on ProSe operation on LC/ULC based on statistics or historical data stored in the memory of the UE e.g. by retrieving from its memory the values of the parameters related to the carrier groups used by the UE most frequently in the past e.g. certain number of times in the past, over a certain time period in the past etc.

The obtaining S1, S2 may also comprise determining the first and second sets of resources based on at least one criterion. In other words, the UE may determine full or partial information related to the ProSe operation on LC/ULC autonomously based on one or more criteria. The UE may then be configured by the network node with one or more pre-defined criteria to be used by the UE for autonomously determining the LC/ULC related information for ProSe operation. Examples of the criteria are the same as the criteria that may be used in a network node discussed above. Examples of criteria are thus load on carriers, a location of the wireless device, a priority level or the type of the D2D operation and information about location of possible carrier frequencies in the frequency bands. The UE may also obtain the full or partial information on LC/ULC related information for ProSe operation directly from one or more other UEs if the UEs are capable of D2D operation.

After having obtained the information defining the first and second sets of resources, the method further comprises selecting S4 one of the first and second sets of resources for D2D operation in ONC, based on information relating to a location of the wireless device. The UE can detect its location by using any positioning method. Examples of positioning methods are GNSS (e.g. GPS), A-GNSS, OTDOA, E-CID or any hybrid positioning method etc. However, sometimes the location cannot be detected. In such cases the fact that the location cannot be detected will cause the wireless device to select one of the first and second sets of resources, typically the second one. In other words, according to some aspects, the method comprises attempting S3 to determine a location of the wireless device. Then the step of selecting S4 comprises selecting the first set of resources when the location is determined to be within a coverage area of the at least one licensed carrier and selecting the second set of resources when failing to determine the location or when the location is determined to be outside a coverage area of the at least one licensed carrier.

According to some aspects, the method in a wireless device also comprises using S5 the selected resources for D2D operation in ONC. Thus, as discussed above, when the wireless device goes ONC, the wireless device uses at least one of the two sets of resources for D2D operation based on whether it operates in licensed or un-licensed areas or whether or not it can detect its location. The coverage of the LA and the coverage of the ULA can be expressed in terms of geographical boundaries. The geographical boundaries in turn can be determined by a set of geographical coordinates, which can be configured at the UE e.g. pre-defined, received from the network node etc.

Location Detection in ONC

In ONC the UE may use any one or combination of positioning methods which are suitable or feasible for the UE positioning without cellular network coverage.

Examples of such methods are satellite based methods (Global navigational satellite system, GNSS, Assisted GNSS such as Global Positioning System, GPS, or A-GPS etc.), terrestrial beacon system, TBS, etc. Yet another example of such positioning technique is peer-to-peer cooperative positioning methods, which is an alternative or complementary technique in the partial or complete absence of network coverage. This method allows D2D capable UEs to exchange data among each other so that not all devices need to be able to receive positioning signals from the (satellite or ground based) infrastructure. For example, consider a ProSe UE1 A located in a local area such as in indoor intends to determine its location but has no GNSS coverage or cannot access the network node signals. In the same area assume there are other ProSe UEs (e.g. UE2 and UE3). The ProSe UE performs signal measurements on ProSe UE1 and UE2 and determines its location with respect to the location of the UE2 and UE3.

If the UE is out of network coverage and the obtained location information indicates that the UE is within the coverage of a LA, then the UE may use the first set of information for performing the ProSe operation. The UE may for example compare the obtained location information to the area which was is pre-configured for the UE for ONC operation. In one example, the UE detects its location to be country A or region A1 within country A using any of the methods for obtaining information described above. The said UE is preconfigured with a list of countries or regions, K, that are allowed for ProSe ONC operation using the pre-configured resources wherein K can be defined as:

$$K=[A1,A2,B3,\ldots,DN] \quad (1)$$

In (1), K includes a list of regions or any geographical location that are supported for ProSe operation in ONC. Since A1 is part of this list, the UE in this example is allowed to perform ProSe operation in licensed spectrum using the preconfigured ProSe resources. Thus the UE may use the first set of information which was obtained in earlier step.

In a second example, the UE receives a first- and second set of information related to LC and ULC operation. The location of the UE, say A3, is however not part of list of regions or any geographical location allowed for ONC operation in equation (1). In this case the UE may choose to use the second set of information which involves UE switching to ProSe operation in un-licensed spectrum. This will enable the UE to still continue performing ProSe operation and provide and/or receive necessary services.

Example Node Configurations

Figure 5:
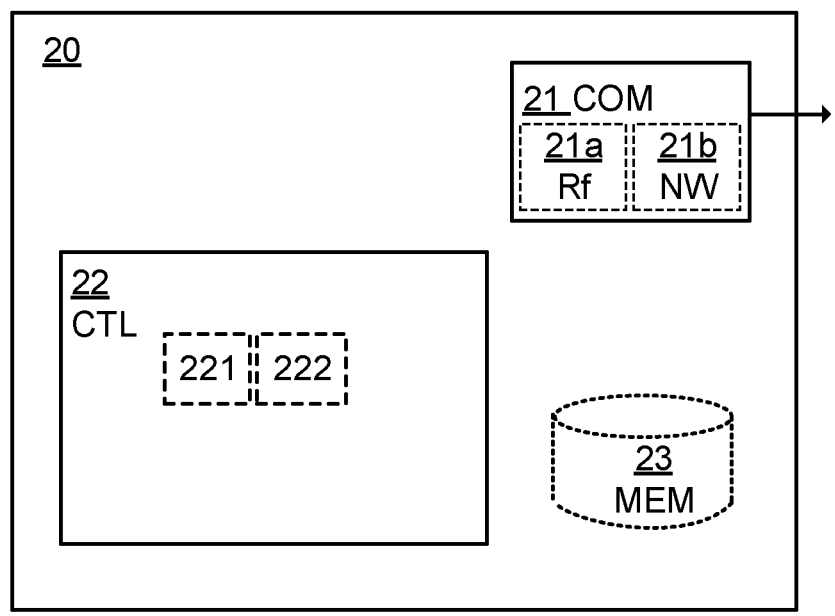
FIG. 5 is an example node configuration of a wireless device, according to some example embodiments.

FIG. 5 illustrates an example of a network node 20 which may incorporate some of the example embodiments discussed above. The network node 20 is typically a network node or base station, such as an eNodeB in LTE. The network node 20 comprises communication interface 21 configured for communication with a wireless device 10. The communication interface 21 may comprise a radio communication interface 21a and a network communication interface 21b. The network node 20 may further comprises a memory 23 and processing circuitry 22.

The radio communication interface 21a is configured for communication with wireless devices within reach of the network node over a radio communication technology. The network communication interface 21b is configured for communication with other network nodes. This communication is often wired e.g. using fiber. However, it may as well be wireless. The connection between network nodes is generally referred to as the backhaul. The controller, CTL, or processing circuitry 22 may be constituted by any suitable Central Processing Unit, CPU, microcontroller, Digital Signal Processor, DSP, etc. capable of executing computer program code. The computer program may be stored in a memory, MEM 23. The memory 23 can be any combination of a Random Access Memory, and a Read Only Memory, ROM. The memory 23 may comprise persistent storage, which, for example, can be any single one or combination of magnetic memory, optical memory, or solid state memory or even remotely mounted memory. According to some aspects, the disclosure relates to a computer program comprising computer program code which, when executed in a network node, causes the network node to execute any aspect of the example node operations described above.

According to some aspects, the disclosure relates to a carrier storing computer program code which, when executed in a network node, causes the network node to execute any aspect of the example node operations described above.

The processing circuitry 22 is configured to cause the network node 20 to determine a first set of resources for D2D operation in ONC on at least one licensed carrier and to determine a second set of resources for D2D operation in ONC on at least one un-licensed carrier. The processing circuitry 22 is further configured to transmit information related to the determined first and second sets of resources for D2D operation in ONCs to the wireless device.

According to some aspects, the processing circuitry 22 is configured to transmit the information using broadcasting system information on a broadcast channel, transmitting at least one dedicated or wireless device specific message, transmitting non-Access stratum signaling message and/or transmitting a message on Medium Access Control, MAC, level.

According to some aspects, the processing circuitry 22 is configured to determine the first and or second sets of resources based on at least one criterion such as load on carriers, a location of the wireless device, a priority level or the type of the D2D operation and/or information about location of possible carrier frequencies in the frequency bands.

According to some aspects, the information further comprises information defining when to use the first and second sets of resources. According to some aspects, the information comprises restrictions for using the first and second sets of resources.

According to some aspects, the network node or the processing circuitry 22 comprises a first determiner 221 configured for determining a first set of resources for D2D operation in ONC on at least one licensed carrier.

According to some aspects, the network node or the processing circuitry 22 comprises a second determiner 222 configured to determine a second set of resources for D2D operation in ONC on at least one un-licensed carrier.

According to some aspects, the radio communication interface 21a is adapted to transmit information related to the determined first and second sets of resources for D2D operation in ONCs to the wireless device.

The network node 20 is further configured to implement all the aspects of the technique discussed in relation to the network node 20 above and below.

Figure 6:
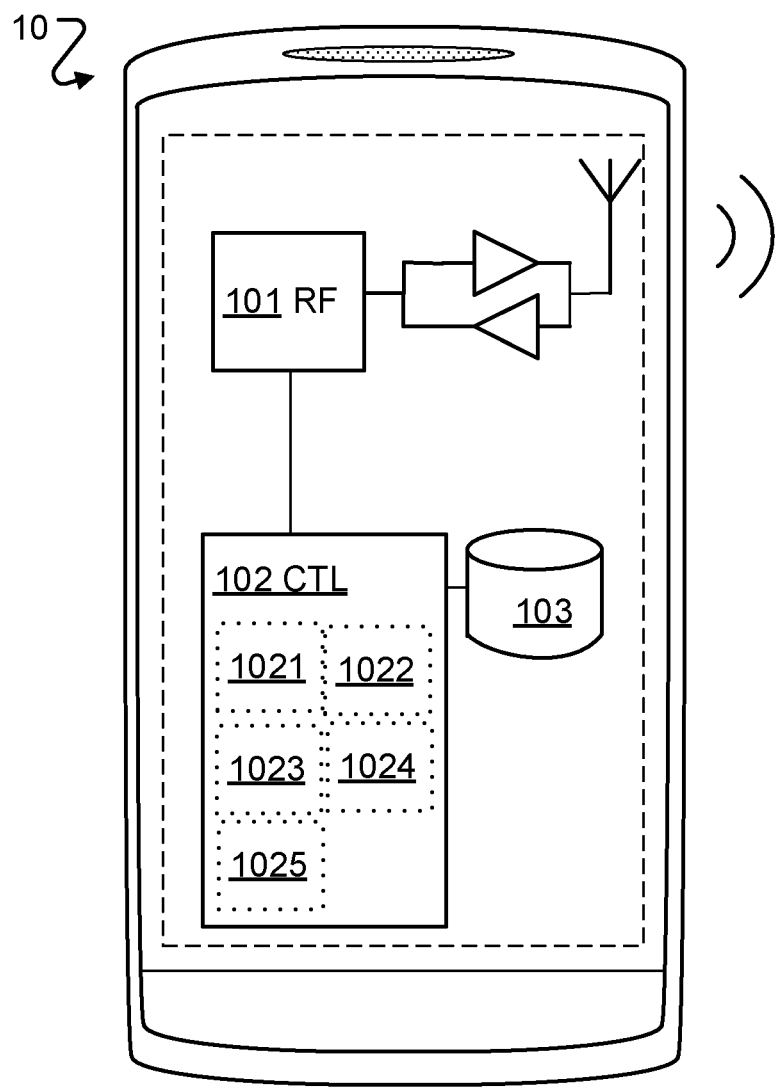
FIG. 6 is an example node configuration of a network node, according to some example embodiments.

FIG. 6 illustrates an example of a wireless device 10 which may incorporate some of the example embodiments discussed above. As shown in FIG. 6, the wireless device 10 may comprise a radio circuitry 101 configured to receive and transmit any form of communications or control signals within a network. It should be appreciated that the radio circuitry 101 may be comprised as any number of transceiving, receiving, and/or transmitting units or circuitry. It should further be appreciated that the radio circuitry 101 may be in the form of any input/output communications port known in the art. The radio circuitry 101 may comprise RF circuitry and baseband processing circuitry (not shown).

The wireless device 10 may further comprise at least one memory unit or circuitry 103 that may be in communication with the radio circuitry 101. The memory 103 may be configured to store received or transmitted data and/or executable program instructions. The memory 103 may also be configured to store any form of beam-forming information, reference signals, and/or feedback data or information. The memory 103 may be any suitable type of computer readable memory and may be of volatile and/or non-volatile type. According to some aspects, the disclosure relates to a computer program comprising computer program code which, when executed in a wireless device, causes the wireless device to execute any aspect of the example node operations described above.

According to some aspects, the disclosure relates to a carrier storing computer program code which, when executed in a wireless device, causes the wireless device to execute any aspect of the example node operations described above.

The wireless device 10 may further comprise further processing circuitry 102 which may be configured to perform measurements are set configurations provided by the eNodeB. The processing circuitry 102 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

The processing circuitry 102 is configured to cause the wireless device 10 to obtain a first set of resources for D2D operation in ONC on at least one licensed carrier, to obtain a second set of resources for D2D operation in ONC on at least one un-licensed carrier and to select one of the first and second sets of resources for D2D operation in ONC, based on information relating to a location of the wireless device.

According to some aspects, the processing circuitry 102 is configured to attempt to determine a location of the wireless device and to select the first set of resources when the location is determined to be within a coverage area of the at least one licensed carrier and to select the second set of resources when failing to determine the location or when the location is determined to be outside a coverage area of the at least one licensed carrier.

According to some aspects, the first set of resources is a contention free set of resources that is reserved for D2D operation. According to some aspects, the processing circuitry 102 is configured to use the selected resources for D2D operation in ONC.

According to some aspects, wherein the D2D operation is ProSe operation. According to some aspects, the D2D operation takes place on a sidelink. According to some aspects, the resources are identified by a frequency and/or a time measure.

According to some aspects, the processing circuitry is configured to obtain the first and/or second sets of resources autonomously. Alternatively, the processing circuitry is configured to obtain the information based on at least one criteria such as load on carriers; a location of the wireless device, a priority level or the type of the D2D operation and information about location of possible carrier frequencies in the frequency bands.

According to some aspects, the processing circuitry is configured to obtain the information by receiving it from a network node.

According to some aspects, the coverage area is expressed in terms of geographical boundaries or geographical coordinates. According to some aspects, the geographical boundaries or coordinates are pre-defined or received from the network node.

According to some aspects, the wireless device or the processing circuitry 102 comprises a first obtainer 1021 configured to obtain a first set of resources for D2D operation in ONC on at least one licensed carrier.

According to some aspects, the wireless device or the processing circuitry 102 comprises a second obtainer 1022 configured to obtain a second set of resources for D2D operation in ONC on at least one un-licensed carrier.

According to some aspects, the wireless device or the processing circuitry 102 comprises a determiner 1023 configured to attempt to determine a location of the wireless device.

According to some aspects, the wireless device or the processing circuitry 102 comprises a selector 1024 configured to obtain selecting one of the first and second sets of resources for D2D operation in ONC, based on information relating to a location of the wireless device.

According to some aspects, the wireless device or the processing circuitry 102 comprises an operator 1025 configured to use the selected resources for D2D operation in ONC.

The wireless device 10 is further configured to implement all the aspects of the technique discussed in relation to the receiving wireless device above and below.

Aspects of the disclosure have been described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a wireless device, for obtaining resources for device to device (D2D) operation in out-of-network coverage (ONC), the method comprising:

obtaining a first set of resources for performing the D2D operation on at least one licensed carrier;

obtaining a second set of resources for performing the D2D operation on at least one un-licensed carrier;

attempting to determine a location of the wireless device; and selecting one of the first and second sets of resources for the D2D operation based on information relating to the location of the wireless device, wherein the selecting comprises selecting the first set of resources responsive to determining the location to be within a coverage area of the at least one licensed carrier and selecting the second set of resources responsive to failing to determine the location, and wherein obtaining the first set of resources and the second set of resources comprises determining at least one of the first and second sets of resources based on following criteria:

load on carriers;

the location of the wireless device;

a priority level or a type of the D2D operation; and information about a location of possible carrier frequencies in frequency bands.

2. The method of claim 1, wherein the selecting further comprises selecting the second set of resources responsive to determining that the location of the wireless device is outside the coverage area of the at least one licensed carrier.

3. The method of claim 1, wherein the coverage area is expressed in terms of geographical boundaries or coordinates.

4. The method of claim 3, wherein the geographical boundaries or coordinates are pre-defined or received from a network node.

5. The method of claim 1, wherein the first set of resources is a contention free set of resources that is reserved for the D2D operation.

6. The method of claim 1, further comprising:
using the selected set of resources for the D2D operation.

7. The method of claim 1, wherein the D2D operation is a ProSe operation.

8. The method of claim 1, wherein the D2D operation takes place on a sidelink.

9. The method of claim 1, wherein the first and second sets of resources are identified by at least one of a frequency measure and a time measure.

10. The method of claim 1, wherein obtaining the first set of resources and the second set of resources further comprises obtaining the at least one of the first and second sets of resources autonomously.

11. The method of claim 1, wherein obtaining the first set of resources and the second set of resources further comprises receiving information related to the first and second sets of resources from a network node.

12. A non-transitory computer readable medium storing a computer program for obtaining resources for device to device (D2D) operation in out-of-network coverage (ONC), the computer program comprising computer program code that, when executed by processing circuitry in a wireless device, causes the wireless device to:

obtain a first set of resources for performing the D2D operation on at least one licensed carrier;

obtain a second set of resources for performing the D2D operation on at least one un-licensed carrier;

attempt to determine a location of the wireless device;

receive information related to the first and second sets of resources for the D2D operation, wherein the information comprises thresholds of signal measurements performed by the wireless device; and select one of the first and second sets of resources for the D2D operation based on the signal measurements exceeding or staying below the thresholds, wherein the selecting further comprises selecting the first set of resources responsive to determining the location to be within a coverage area of the at least one licensed carrier and selecting the second set of resources responsive to failing to determine the location, and wherein the first set of resources and the second set of resources are obtained by determining at least one of the first and second sets of resources based on following criteria:
load on carriers;
the location of the wireless device;
a priority level or a type of the D2D operation; and
information about a location of possible carrier frequencies in frequency bands.

13. A method performed in a network node, for assisting device to device (D2D) operation in out-of-network coverage (ONC), the method comprising:
determining a first set of resources for performing the D2D operation on at least one licensed carrier;
determining a second set of resources for performing the D2D operation on at least one un-licensed carrier; and
transmitting information related to the determined first and second sets of resources for the D2D operation to a wireless device,
wherein determining the first set of resources and the second set of resources is based on following criteria:
load on carriers;
a location of the wireless device;
a priority level or a type of the D2D operation; and
information about a location of possible carrier frequencies in frequency bands, and
wherein the wireless device attempts to determine the location of the wireless device and selects one of the first and second sets of resources for the D2D operation by selecting the first set of resources responsive to determining the location of the wireless device to be within a coverage area of the at least one licensed carrier and selecting the second set of resources responsive to failing to determine the location of the wireless device.

14. The method of claim 13, wherein the information is transmitted using at least one of following mechanisms:
broadcasting system information on a broadcast channel;
transmitting at least one dedicated or wireless device specific message;
transmitting a non-Access stratum signaling message; and
transmitting a message on a Medium Access Control (MAC) level.

15. The method of claim 13, wherein the information related to the determined first and second sets of resources comprises information defining when to use the first and second sets of resources.

16. The method of claim 13, wherein the information related to the determined first and second sets of resources comprises restrictions for using the first and second sets of resources.

17. A non-transitory computer readable medium storing a computer program for assisting device to device (D2D) operation in out-of-network coverage (ONC), the computer program comprising computer program code that, when executed by processing circuitry in a network node, causes the network node to:

determine a first set of resources for performing the D2D operation on at least one licensed carrier;
determine a second set of resources for performing the D2D operation on at least one un-licensed carrier; and
transmit information related to the determined first and second sets of resources for the D2D operation to a wireless device,
wherein at least one of the first and second sets of resources is determined based on following criteria:
load on carriers;
a location of the wireless device;
a priority level or a type of the D2D operation; and
information about a location of possible carrier frequencies in frequency bands, and
wherein the wireless device attempts to determine the location of the wireless device and selects one of the first and second sets of resources for the D2D operation by selecting the first set of resources responsive to determining the location of the wireless device to be within a coverage area of the at least one licensed carrier and selecting the second set of resources responsive to failing to determine the location of the wireless device.

18. A wireless device configured for device-to-device (D2D) communication in a communication system, the wireless device comprising:
radio circuitry; and
processing circuitry configured to:
obtain a first set of resources for performing D2D operation, the in out-of-network coverage (ONC), on at least one licensed carrier;
obtain a second set of resources for performing the D2D operation, in the ONC, on at least one un-licensed carrier;
attempt to determine a location of the wireless device; and
select one of the first and second sets of resources for the D2D operation in the ONC, based on information relating to the location of the wireless device, wherein the processing circuitry is configured to select the first set of resources responsive to a determination that the location is within a coverage area of the at least one licensed carrier and select the second set of resources responsive to failing to determine the location, and
wherein the processing circuitry is configured to obtain at least one of the first and second sets of resources based on following criteria:
load on carriers;
the location of the wireless device;
a priority level or a type of the D2D operation; and
information about a location of possible carrier frequencies in frequency bands.

19. The wireless device of claim 18, wherein the processing circuitry is further configured to:
select the second set of resources responsive to a determination that the location of the wireless device is outside the coverage area of the at least one licensed carrier.

20. The wireless device of claim 18, wherein the coverage area is expressed in terms of geographical boundaries or coordinates.

21. The wireless device of claim 20, wherein the geographical boundaries or coordinates are pre-defined or received from a network node.

22. The wireless device of claim 18, wherein the first set of resources is a contention free set of resources that is reserved for the D2D operation.

23. The wireless device of claim 18, wherein the processing circuitry is further configured to:
use the selected set of resources for the D2D operation in the ONC.

24. The wireless device of claim 18, wherein the D2D operation is a ProSe operation.

25. The wireless device of claim 18, wherein the D2D operation takes place on a sidelink.

26. The wireless device of claim 18, wherein the first and second sets of resources are identified by at least one of a frequency measure and a time measure.

27. The wireless device of claim 18, wherein the processing circuitry is configured to obtain the at least one of the first and second sets of resources autonomously.

28. The wireless device of claim 18, wherein the processing circuitry is configured to obtain the at least one of the first and second sets of resources by receiving information related to the first and second sets of resources from a network node.

29. A network node in a cellular communication network configured for assisting device to device (D2D) operation in out-of-network coverage (ONC), the network node comprising:
a communication interface; and
processing circuitry configured to:
determine a first set of resources for performing the D2D operation on at least one licensed carrier;
determine a second set of resources for performing the D2D operation on at least one un-licensed carrier; and
transmit, using the communication interface, information related to the determined first and second sets of resources for the D2D operation to a wireless device, wherein the processing circuitry is configured to determine at least one of the first and second sets of resources based on following criteria:
load on carriers;
a location of the wireless device;
a priority level or a type of the D2D operation; and
information about a location of possible carrier frequencies in frequency bands, and
wherein the wireless device attempts to determine the location of the wireless device and selects one of the first and second sets of resources for the D2D operation by selecting the first set of resources responsive to determining the location of the wireless device to be within a coverage area of the at least one licensed carrier and selecting the second set of resources responsive to failing to determine the location of the wireless device.

30. The network node of claim 29, wherein the processing circuitry is configured to transmit the information using at least one of following mechanisms:
broadcasting system information on a broadcast channel;
transmitting at least one dedicated or wireless device specific message;
transmitting a non-Access stratum signaling message; and
transmitting a message on a Medium Access Control (MAC) level.

31. The network node of claim 29, wherein the information related to the determined first and second sets of resources comprises information defining when to use the first and second sets of resources.

32. The network node of claim 29, wherein the information related to the determined first and second sets of resources comprises restrictions for using the first and second sets of resources.

* * * * *